United States Patent
Kumar et al.

(10) Patent No.: US 11,734,122 B2
(45) Date of Patent: Aug. 22, 2023

(54) BACKUP TASK PROCESSING IN A DATA STORAGE SYSTEM

(71) Applicant: EMC IP Holding Company LLC, Hopkinton, MA (US)

(72) Inventors: Shiv Shankar Kumar, Pune (IN); Avadut Mungre, North Goa (IN); Krishna Maheshwari, Pune (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 219 days.

(21) Appl. No.: 17/031,161

(22) Filed: Sep. 24, 2020

(65) Prior Publication Data

US 2022/0091940 A1   Mar. 24, 2022

(51) Int. Cl.
  *G06F 11/14*  (2006.01)
  *G06F 21/56*  (2013.01)
  *G06F 16/27*  (2019.01)

(52) U.S. Cl.
  CPC .......... *G06F 11/1451* (2013.01); *G06F 16/27* (2019.01); *G06F 21/56* (2013.01); *G06F 2221/034* (2013.01)

(58) Field of Classification Search
  CPC .................................................. G06F 11/1451
  See application file for complete search history.

(56) References Cited

U.S. PATENT DOCUMENTS

| | | | |
|---|---|---|---|
| 9,391,865 B1 * | 7/2016 | Thiam | G06F 11/2025 |
| 2012/0198042 A1 * | 8/2012 | Dunbar | H04N 21/2407 709/223 |
| 2017/0235950 A1 * | 8/2017 | Gopalapura Venkatesh | G06F 11/1464 726/24 |
| 2018/0157752 A1 * | 6/2018 | Arikatla | G06F 16/951 |
| 2021/0232464 A1 * | 7/2021 | Su | G06F 16/178 |
| 2021/0390080 A1 * | 12/2021 | Tripathi | G06F 21/62 |

* cited by examiner

*Primary Examiner* — Mariela Reyes
*Assistant Examiner* — Courtney Harmon
(74) *Attorney, Agent, or Firm* — Amin, Turocy & Watson, LLP

(57) ABSTRACT

Malware scan task processing in a data storage system is described herein. A method as described herein can include designating, by a device operatively coupled to a processor, a file stored by a primary cluster of a data storage system for a malware scan; locating, by the device, a secondary cluster of the data storage system having stored thereon a copy of the file, the secondary cluster being distinct from the primary cluster; and, in response to determining that the file stored by the primary cluster matches the copy of the file stored by the secondary cluster, causing, by the device, a second anti-malware server associated with the secondary cluster to perform the malware scan for the copy of the file instead of a first anti-malware server associated with the primary cluster.

20 Claims, 11 Drawing Sheets

BACKUP TASK PROCESSING IN A DATA STORAGE SYSTEM

TECHNICAL FIELD

The subject application is related to data storage, and more particularly, to techniques for data backup in a data storage system.

BACKGROUND

As computing technology has advanced over time, so too has the amount and scope of data that can be maintained and analyzed via computer systems. For instance, the ability to manage very large data sets, commonly known as big data, has led to significant advances in fields such as manufacturing, media, science, and e-commerce, among many others. Data storage systems, such as those utilized in network-attached storage (NAS) platforms, provide the means by which these large sets of data can be maintained in an efficient and reliable way.

In addition to providing a means for storing data, an NAS platform can implement one or more data security and/or protection techniques to ensure the integrity of data stored on the platform. For instance, an NAS platform can back up stored files and/or other data to internal and/or external systems according to one or more backup policies.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system can include a memory that stores executable components and a processor that executes the executable components stored in the memory. The executable components can include a backup initiation component that selects a group of files stored by a primary computing cluster of the data storage system for backup to a media server according to a backup policy. The executable components can further include a policy handler component that identifies a secondary computing cluster of the data storage system having a copy of a first file of the group of files that matches the first file as stored by the primary computing cluster, where the secondary computing cluster is distinct from the primary computing cluster. The executable components can also include a data management application component that, in response to the policy handler component identifying the secondary computing cluster, directs the secondary computing cluster to transfer the copy of the first file to the media server instead of directing the primary computing cluster to transfer the first file to the media server.

In another aspect, a method is described herein. The method can include designating, by a first system operatively coupled to a processor, a group of files stored by a first cluster of the first system for backup to a second system according to a backup policy; determining, by the first system, that a second cluster of the first system has stored thereon a copy of a first file of the group of files that matches the first file as stored by the first cluster, where the second cluster is distinct from the first cluster; and, in response to the determining, causing, by the first system, the second cluster to transfer the copy of the first file to the second system instead of causing the first cluster to transfer the first file to the second system.

In an additional aspect, a machine-readable medium including executable instructions is described herein. The instructions, when executed by a processor of a data storage system, can facilitate performance of operations including receiving a backup policy for transferal of a group of files from a primary storage location of the data storage system to a media server, identifying a secondary storage location of the data storage system having a copy of a first file of the group of files that is determined to match the first file as stored at the primary storage location, and in response to the identifying, causing the copy of the first file to be transferred from the secondary storage location to the media server instead of causing the first file to be transferred from the primary storage location to the media server.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Figure 1:
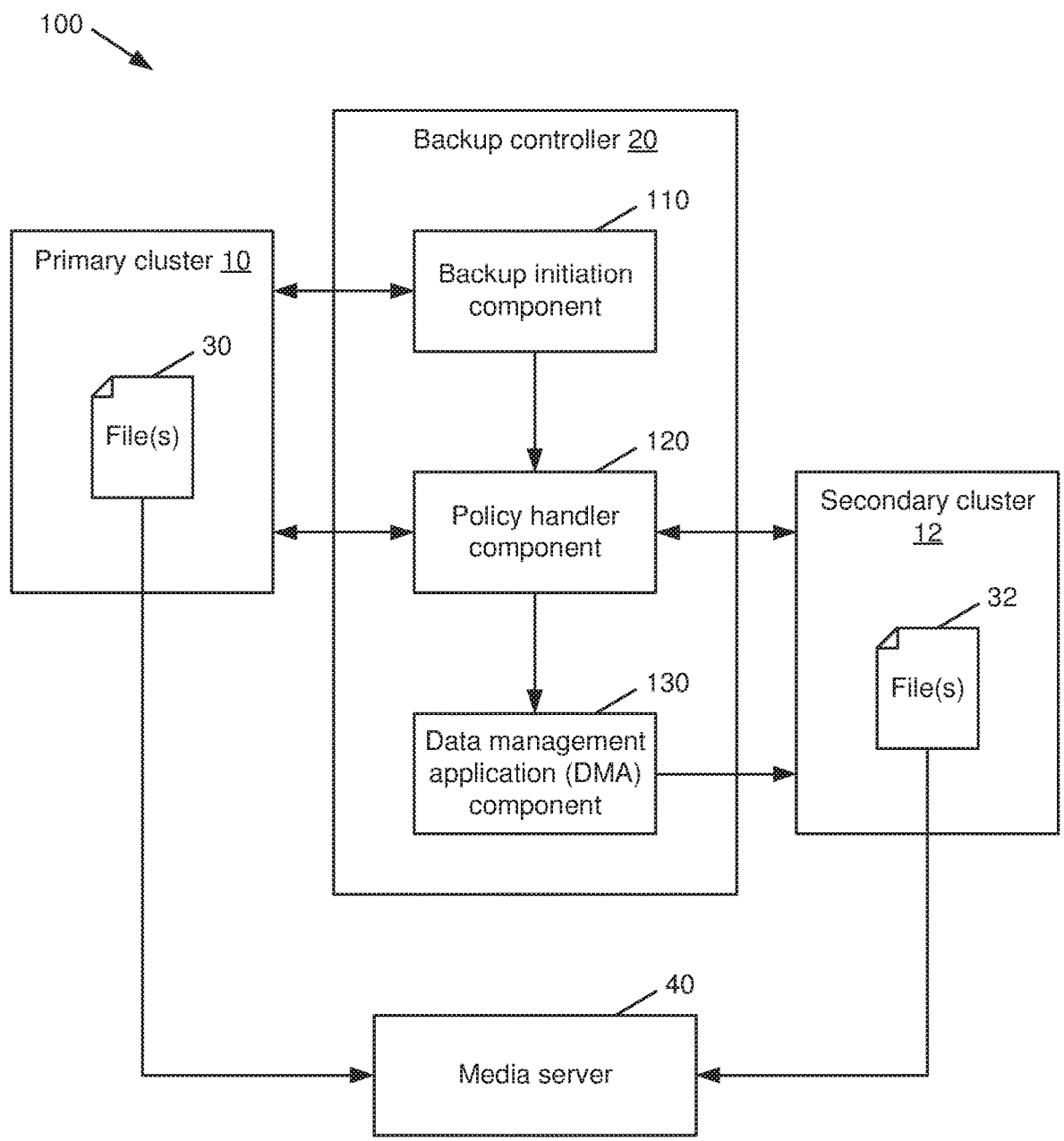
FIG. 1 is a block diagram of a system that facilitates backup task processing in a data storage system in accordance with various aspects described herein.

With reference now to the drawings, FIG. 1 illustrates a block diagram of a system 100 that facilitates backup task (job) processing in a data storage system in accordance with various aspects described herein. In an aspect, system 100 can utilize a replication facility for disaster recovery in order to enhance the security of data stored by system 100. For instance, system 100 as shown in FIG. 1 includes a primary storage cluster 10, referred to herein as simply a "primary cluster," and one or more secondary storage clusters 12, referred to herein as simply "secondary clusters." While only one secondary cluster 12 is illustrated in FIG. 1, it should be appreciated that system 100 can include any suitable number of secondary clusters 12. As used herein, a "cluster" refers to a grouping of one or more computing devices that are tasked with storage and maintenance of data associated with system 100.

In an aspect, recurring replication jobs can be defined via replication policies on the primary cluster 10 to replicate stored data to the secondary cluster(s) 12. While the primary cluster 10 and secondary cluster 12 are shown in FIG. 1 as being distinct entities, e.g., associated with different computing sites, it should be appreciated that respective clusters associated with a data storage system can be hosted within a same site, distributed among several sites, and/or configured in any other suitable manner Data replication from a primary cluster 10 to a secondary cluster 12 is described in further detail below with respect to FIGS. 2-3.

In addition to replication, the primary cluster 10 as shown in system 100 can be tasked with serving client input/output (I/O) requests. While the primary cluster 10 actively serves I/O requests, the secondary cluster 12 can remain idle, e.g., to await any failure conditions on the primary cluster 10 in order to become active.

As further shown in FIG. 1, system 100 can further include a backup controller 20 that can manage backup of data stored on system 100, e.g., periodically and/or according to one or more backup policies. For instance, the backup controller 20 as shown in system 100 can initiate a Network Data Management Protocol (NDMP) three-way backup operation, during which a data management application (DMA), e.g., as implemented by a DMA component 130 as described in further detail below, can instruct an NDMP server (e.g., as implemented by one or more of the primary cluster 10 or the secondary cluster 12 of system 100) to start backing up stored data to a media agent or server 40 that is either attached to the network associated with system 100 or directly attached to the backup controller 20. The media server 40 can, in turn, write the backup data provided by the cluster(s) 10, 12 to backup media according to various techniques as known in the art.

While the backup controller 20 is shown in FIG. 1 as implemented separately from the primary cluster 10 and the secondary cluster 12, it should be appreciated that some or all functionality of the backup controller 20 as provided herein could be implemented at the primary cluster 10 and/or the secondary cluster 12 in addition to, or in place of, a standalone backup controller 20.

In an aspect, backup tasks, e.g., NDMP three-way backup operations or other suitable operations, can consume resources of the primary cluster 10, e.g., in terms of power consumption, processor cycles, network bandwidth, etc. This, in turn, can reduce the performance of the primary cluster 10 and adversely impact client I/O requests.

Accordingly, system 100 can reduce the impact of backup tasks on the performance of the primary cluster 10 as noted above by offloading backup operations to one or more associated secondary clusters 12 under various conditions. Since the secondary cluster(s) 12 associated with the primary cluster 10 would otherwise be idle awaiting a failover event from the primary cluster 10, these operations can be shifted to the secondary cluster(s) 12 with minimal impact on overall system performance. As a result, the primary cluster 10 can assign more of its resources to serve client I/O requests while utilizing the computing capacity of secondary cluster(s) 12 for backup operations. Accordingly, various embodiments as described herein provide advantages that improve the functionality of the primary cluster 10 in terms of resource utilization, e.g., in terms of processor cycles, memory usage, power consumption, network bandwidth, etc. Other advantages of the embodiments described herein can also be realized.

As shown by FIG. 1, system 100 can achieve the foregoing and/or related ends via a backup initiation component 110, a policy handler component 120, and a DMA component 130, each of which are described in further detail below. To reiterate the above, while the components 110, 120, 130 are each shown in FIG. 1 as being associated with a standalone backup controller 20, it should be appreciated that the components 110, 120, 130 could be implemented in any suitable manner across any number of computing devices or clusters, e.g., the primary cluster 10, the secondary cluster(s) 12, and/or any other suitable devices. Also or alternatively, the operations described below with respect to each of the individual components 110, 120, 130 could themselves be distributed over one or more computing devices or clusters, e.g., such that the functionality of a single component is distributed across multiple computing devices or clusters. Other implementations are also possible.

In a further aspect, the components 110, 120, 130 of system 100 can be implemented in hardware, software, or a combination of hardware and software. By way of example, the components 110, 120, 130 can be implemented as computer-executable components, e.g., components stored on a memory and executed by a processor. An example of a computer architecture including a processor and a memory that can be used to implement the components 110, 120, 130, as well as other components as will be described herein, is shown and described in further detail below with respect to FIG. 11.

In an aspect, the backup initiation component 110 can select a group of files 30 that is stored by a primary cluster 10 of system 100 for backup, e.g., for backup to a media server 40 or media agent device according to a backup policy. While FIG. 1 depicts an example of a three-way backup operation that is initiated at the primary cluster 10 by a backup controller 20, other backup operations could also be performed without departing from the scope of this description. Additionally, in some implementations, the primary cluster 10 can be configured to provide respective files 30 to a backup medium directly instead of through the media server 40. Other implementations are also possible.

In another aspect, the policy handler component 120 of system 100 can identify a secondary cluster 12 of system 100 that has copies 32 of one or more files of the group of files 30 as selected for backup by the backup initiation component 110 as described above. For instance, the policy handler component 120 can identify a secondary cluster 12 that has stored thereon a copy 32 of a given file 30 of the group of files selected for backup based on file attributes and/or other information that are maintained in the course of replicating the file 30 to the secondary cluster 12, as will be described in further detail below with respect to FIGS. 2-4.

In response to the policy handler component 120 identifying a secondary cluster 12 having a copy 32 of a file 30 designated for backup, the DMA component 130 of system 100 can direct the secondary cluster 12 to transfer the copy 32 of the file 30 to the media server 40 and/or other designated backup destination, e.g., instead of directing the primary cluster 10 to transfer the file 30 to the backup destination. In doing so, the DMA component 130 can facilitate the offloading of at least a portion of backup operations to the secondary cluster 12, thereby freeing resources of the primary cluster 10 to manage client I/O requests and/or other computing tasks.

Figure 2:
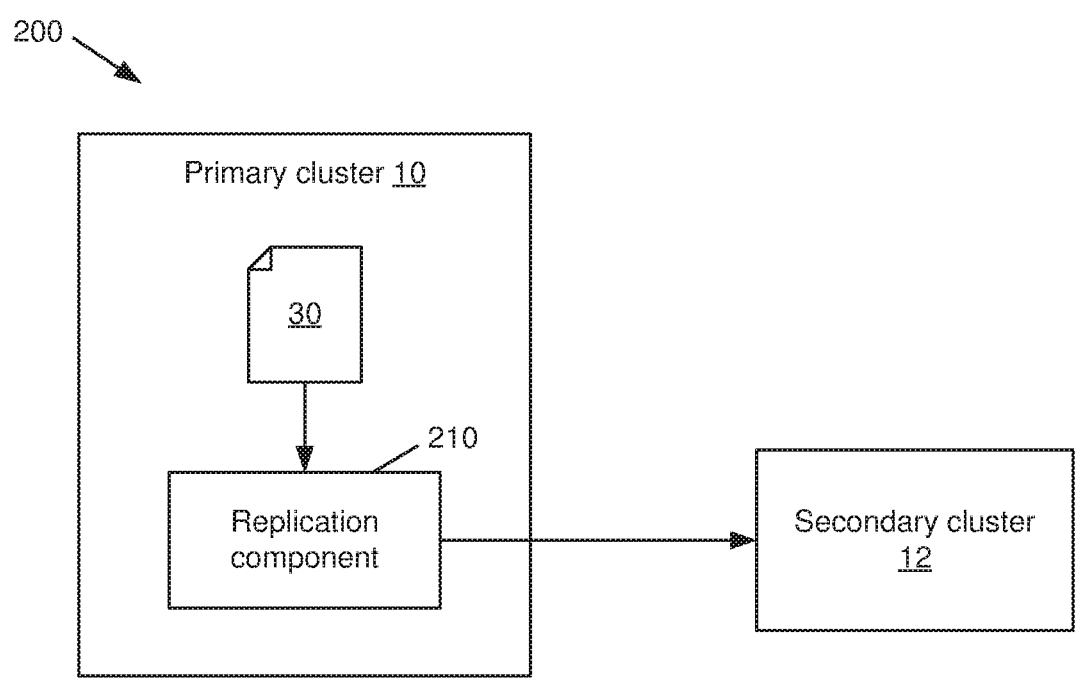
FIG. 2 is a block diagram of a system that facilitates data replication from a primary cluster to a secondary cluster in accordance with various aspects described herein.

Turning now to FIG. 2, a block diagram of a system 200 that facilitates data replication from a primary cluster 10 to a secondary cluster 12 in accordance with various aspects described herein is illustrated. Repetitive description of like elements employed in other embodiments described herein is omitted for brevity. As shown by FIG. 2, system 200 includes a replication component 210 that can replicate respective files 30 stored by the primary cluster 10 to one or more secondary clusters 12, e.g., resulting in copies 32 of the files 30 (not shown in FIG. 2) being stored at the secondary cluster(s) 12. In an aspect, data replication from the primary cluster 10 to a secondary cluster 12 can occur regularly, e.g., according to a schedule, and/or in response to various conditions as defined by a replication policy and/or by other means. In another aspect, replication of data from the primary cluster 10 to a secondary cluster 12 can occur in any suitable manner, e.g., according to one or more replication techniques known in the art.

In an aspect, data relating to files 30 that have been replicated to respective secondary clusters 12 can be collected and maintained in order to facilitate distributed backup operations in a data storage system. For instance, as shown by system 300 in FIG. 3, a replication logging component 310 can be used to create respective records for files 30 in a replication data structure 50, e.g., in response to the replication component 210 successfully replicating the files 30 to a secondary cluster 12.

Figure 3:
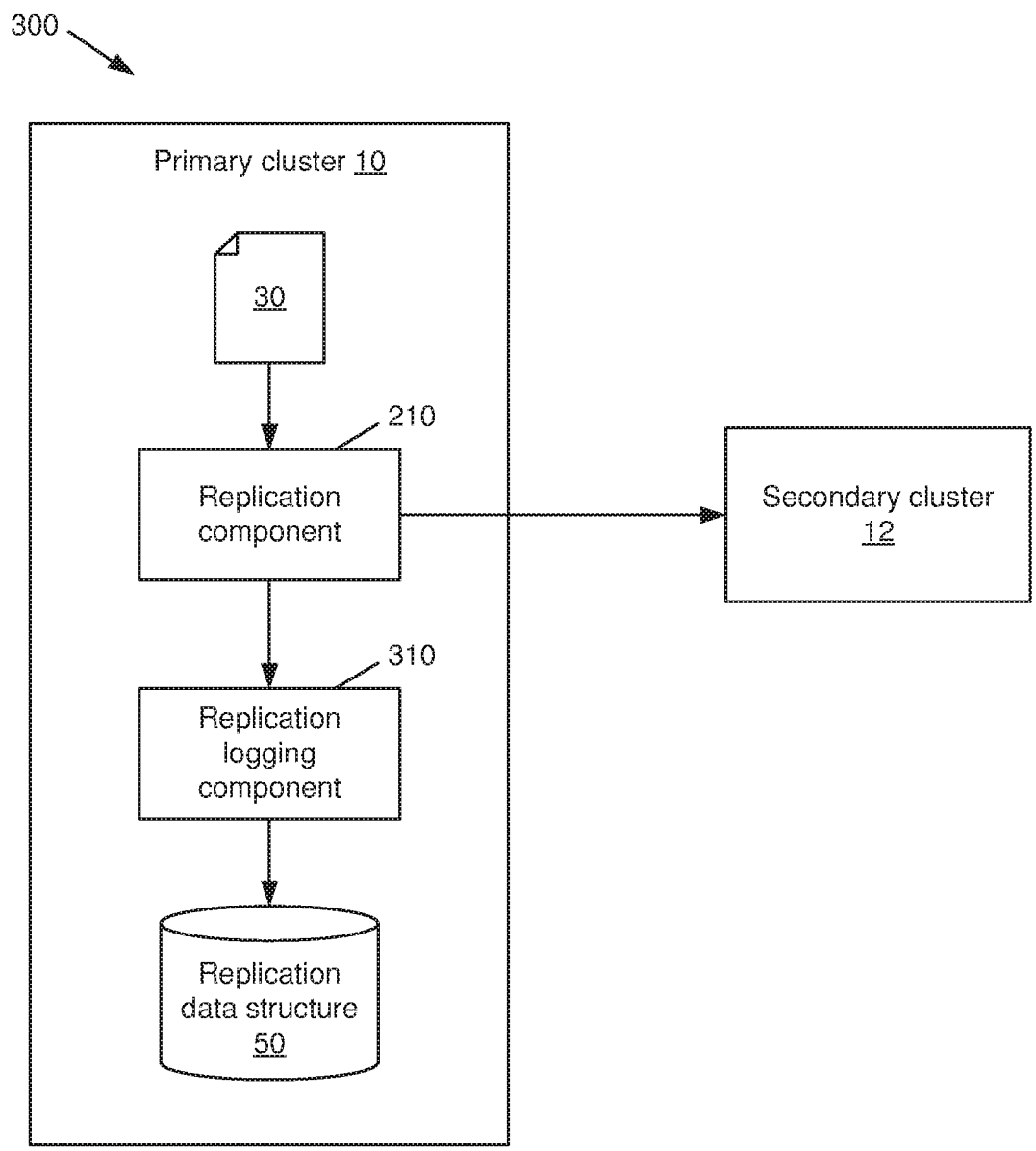
FIG. 3 is a block diagram of a system that facilitates maintaining replication state and location information for a file in accordance with various aspects described herein.
Figure 4:
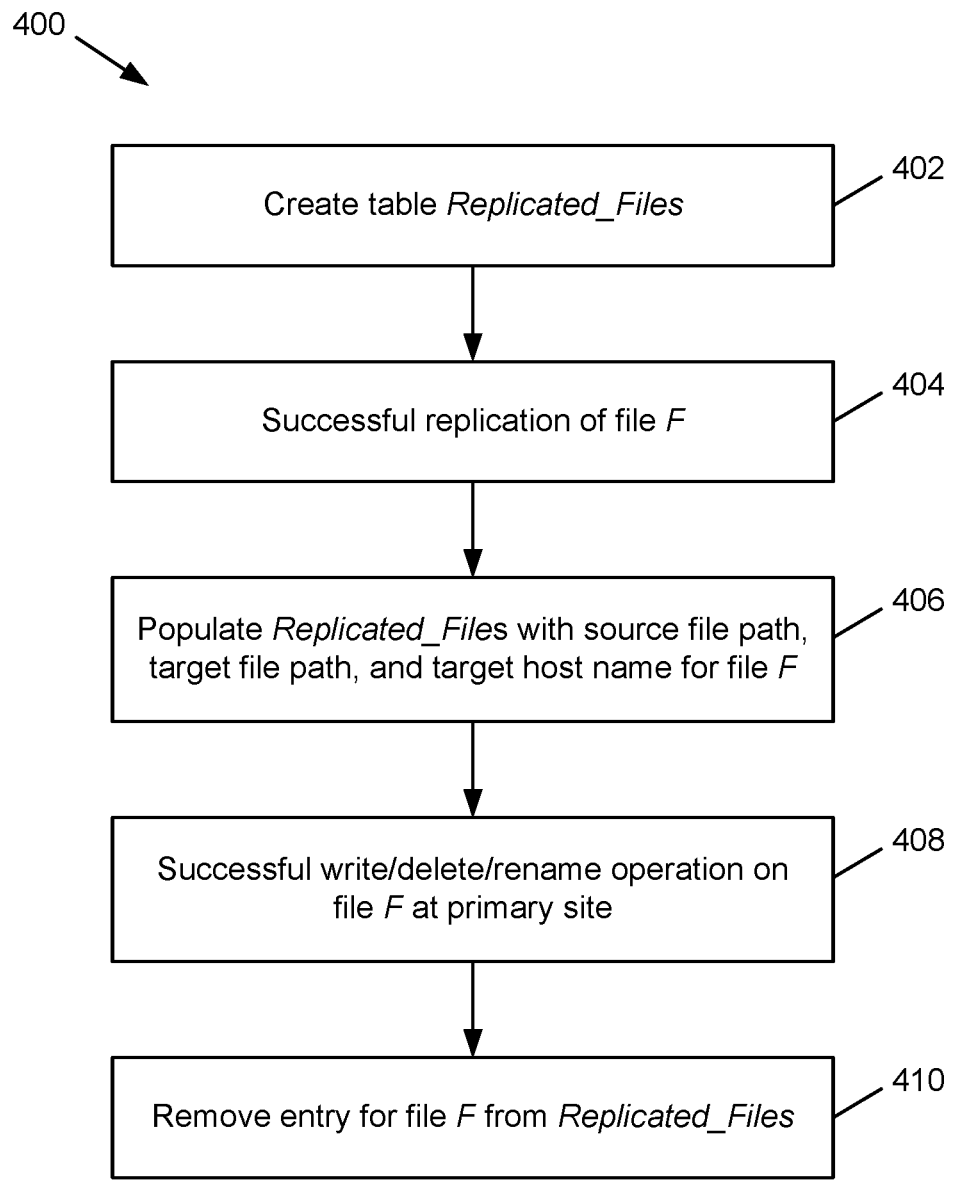
FIG. 4 is a flow diagram of a method for maintaining replication state and location information for a file in accordance with various aspects described herein.

Turning now to FIG. 4 and with further reference to FIG. 3, a method 400 that can be utilized, e.g., by the replication logging component 310, for creating and maintaining the replication data structure 50 is illustrated. It should be appreciated, however, that method 400 is merely one way in which the replication logging component 310 can manage the replication data structure 50 and that other ways are also possible.

Method 400 as shown in FIG. 4 starts at 402, in which the replication logging component 310 creates the replication data structure 50 as a table named Replicated_Files for storing data relating to successfully replicated files. While method 400 illustrates an example of the replication data structure 50 being a table, it should be appreciated that any other suitable data structure, such as a list or linked list, a tree structure, and/or any other suitable structure(s) could also be used.

In an aspect, the Replicated_Files table created at 402 can include fields for source file path, target file path, and replication target, e.g., such that the table is created as Replicated_Files <source_file_path, target_file_path, replication_target>. While the subsequent acts described in method 400 with reference to this table structure, it should be appreciated that other table structures could be used as appropriate. In another aspect, the Replicated_Files table can be made accessible to all nodes on a given cluster, e.g., the primary cluster 10 as shown in system 300 and/or another suitable cluster.

Next, at 404, a file F can be replicated, e.g., from the primary cluster 10 to the secondary cluster 12 via the replication component 210 as shown in FIGS. 2-3. In response to file F being successfully replicated at 404, method 400 can continue to 406, in which the replication logging component 310 can populate the Replicated_Files table, e.g., based on the fields associated with the table. Accordingly, for a replication of file F from the primary cluster 10 to the secondary cluster 12, the replication logging component can populate Replicated_Files at 406 based on the table structure as given above with data corresponding to the source file path (e.g., the file path for file F on the primary cluster 10) and the target file path (e.g., the file path for file F on the secondary cluster 12) for file F.

As additionally shown at 406, the replication logging component 310 can further populate Replicated_Files with the target host name associated with the replication at 404, which can be an identifier associated with the secondary cluster 12, or one or more computing devices within the secondary cluster 12, to which file F was replicated at 404. In an aspect, the replication logging component 310 can add the target host name for file F to Replicated_Files at 406 in the event that a given primary cluster 10 is associated with multiple different secondary clusters 12 in order to direct operations associated with file F to the specific secondary cluster 12 to which said file was replicated.

As further shown at 408, file F can be modified at its primary site, e.g., the primary cluster 10 shown in system 300, via one or more write, delete, rename, and/or other similar operations subsequent to the replication of file F at 404. As a result of the operation(s) performed at 408, file F as stored on the primary site, e.g., primary cluster 10, can potentially be different from the version of file F that was replicated to a secondary site, e.g., secondary cluster 12, at 404. As a result, the replication logging component 310 can remove the entry for file F in Replicated_Files at 410 pending subsequent replication of the modified version of file F to a secondary site.

Figure 5:
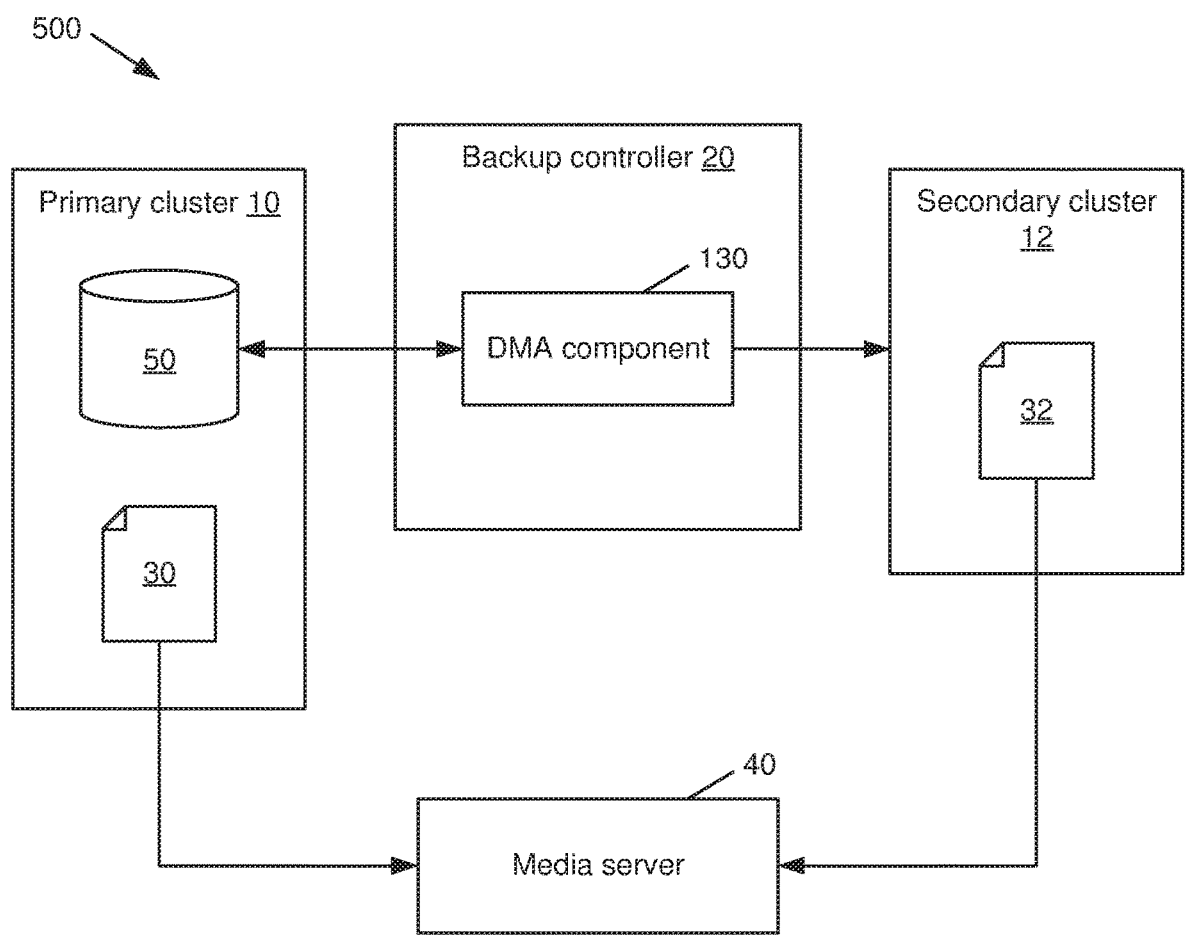
FIG. 5 is a block diagram of a system that facilitates file backup from multiple distinct computing clusters based on replication state and location information in accordance with various aspects described herein.

Referring next to FIG. 5, a block diagram of a system 500 that facilitates file backup from multiple distinct computing clusters (e.g., a primary cluster 10 and a secondary cluster 12) based on replication state and location information, e.g., as maintained as described above with respect to FIGS. 3-4, is illustrated. Repetitive description of like elements employed in other embodiments described herein is omitted for brevity. As shown by FIG. 5, a DMA component 130 of a backup controller 20, e.g., the DMA component 130 described above with respect to FIG. 1, can utilize a replication data structure 50 as maintained by a primary cluster 10 and/or any other suitable device(s) or cluster(s) in system 500 to determine whether there exists a secondary cluster 12 that contains a current copy 32 of a file 30 that is stored by the primary cluster 10 and designated for backup. If the replication data structure 50 indicates that a valid copy 32 of a designated file 30 is present on a secondary cluster 12, e.g., due to the copy 32 being recorded on the replication data structure 50 by a replication logging component 310 according to method 400, the DMA component 130 can direct the secondary cluster 12 to transfer the copy 32 of the file 30 to a media server 40 and/or other designated location instead of directing the primary cluster 10 to transfer the file 30 itself. Alternatively, if a valid copy 32 of the designated file 30 is not present at a secondary cluster 12, e.g., as indicated by a record for the file 30 being absent from the replication data structure 50, the DMA component 130 can instead direct the primary cluster 10 to transfer the file 30 to the media server 40 or other designated backup destination.

Figure 6:
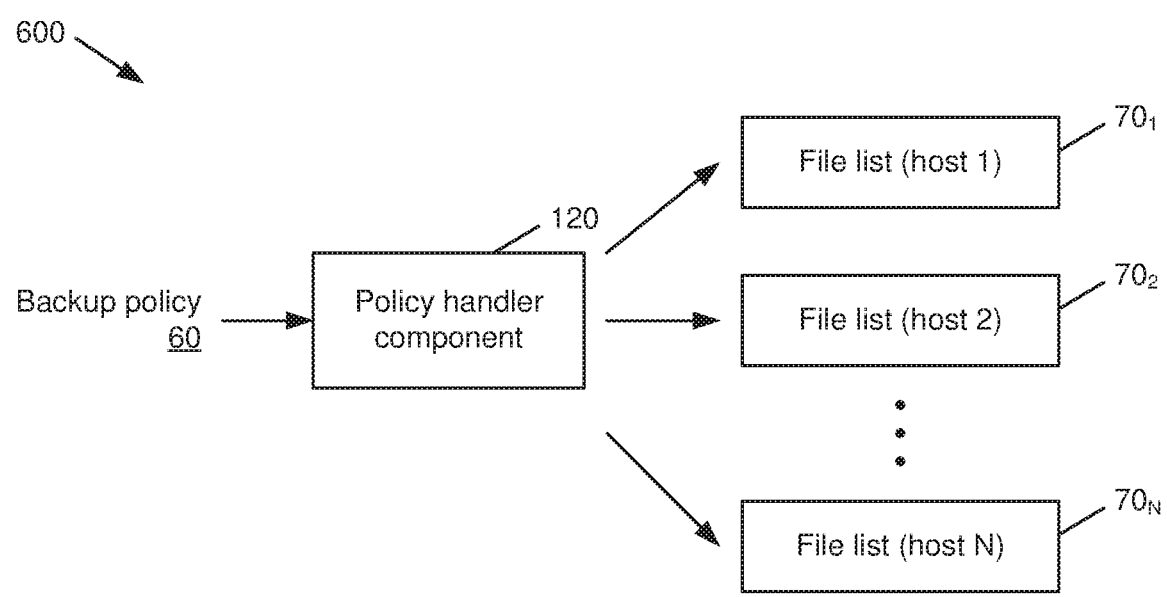
FIG. 6 is a diagram depicting generation of respective file lists corresponding to a set of files designated for backup in accordance with various aspects described herein.

Turning now to diagram 600 in FIG. 6, the policy handler component 120 as described above with respect to FIG. 1 can accept as input a backup policy 60. In an aspect, the backup policy 60 shown in diagram 600 can be a policy configured by the DMA component 130 and/or by any other suitable entities. In existing systems, the DMA component 130 initiates a backup job directly per this backup policy 60. In contrast, the policy handler component 120 as shown in diagram 600 can be implemented as an HTTP (hypertext transfer protocol) handler and/or as another suitable helper module that can be called by the DMA component 130 before execution of the backup policy 60. As further shown by diagram 600, the policy handler component 120 can return multiple file lists 70, here N file lists $70_1$-$70_N$, each of which being associated with a target host to which respective files indicated in the backup policy have been replicated, e.g., as described above with respect to FIG. 2. In an aspect, the respective file lists 70 generated by the policy handler component 120 as shown in diagram 600 can include respective sub-groups of a group of files that have been replicated to respective computing clusters of an associated data storage system, e.g., as indicated by a replication data structure 50 as described above with respect to FIGS. 3-4.

In an aspect, operation of the policy handler component 120 as shown in FIG. 6 can be initiated in response to a DMA component 130 sending an HTTP request to the policy handler component 120. This request can include details of an associated backup policy, as well as environment variables and/or other information, such as a backup folder associated with the policy, include/exclude file patterns, etc. In a further aspect, the HTTP request can be provided to the policy handler component 120 in response to one or more conditions, e.g., a scheduled backup start time or the like.

In response to receiving the HTTP request, the policy handler component 120 can begin processing by parsing the request to extract the backup folders, environment variables, and/or other information provided in the request. Based on this extracted information, the policy handler component 120 can then obtain a list of files to be backed up via the backup policy 60.

Figure 7:
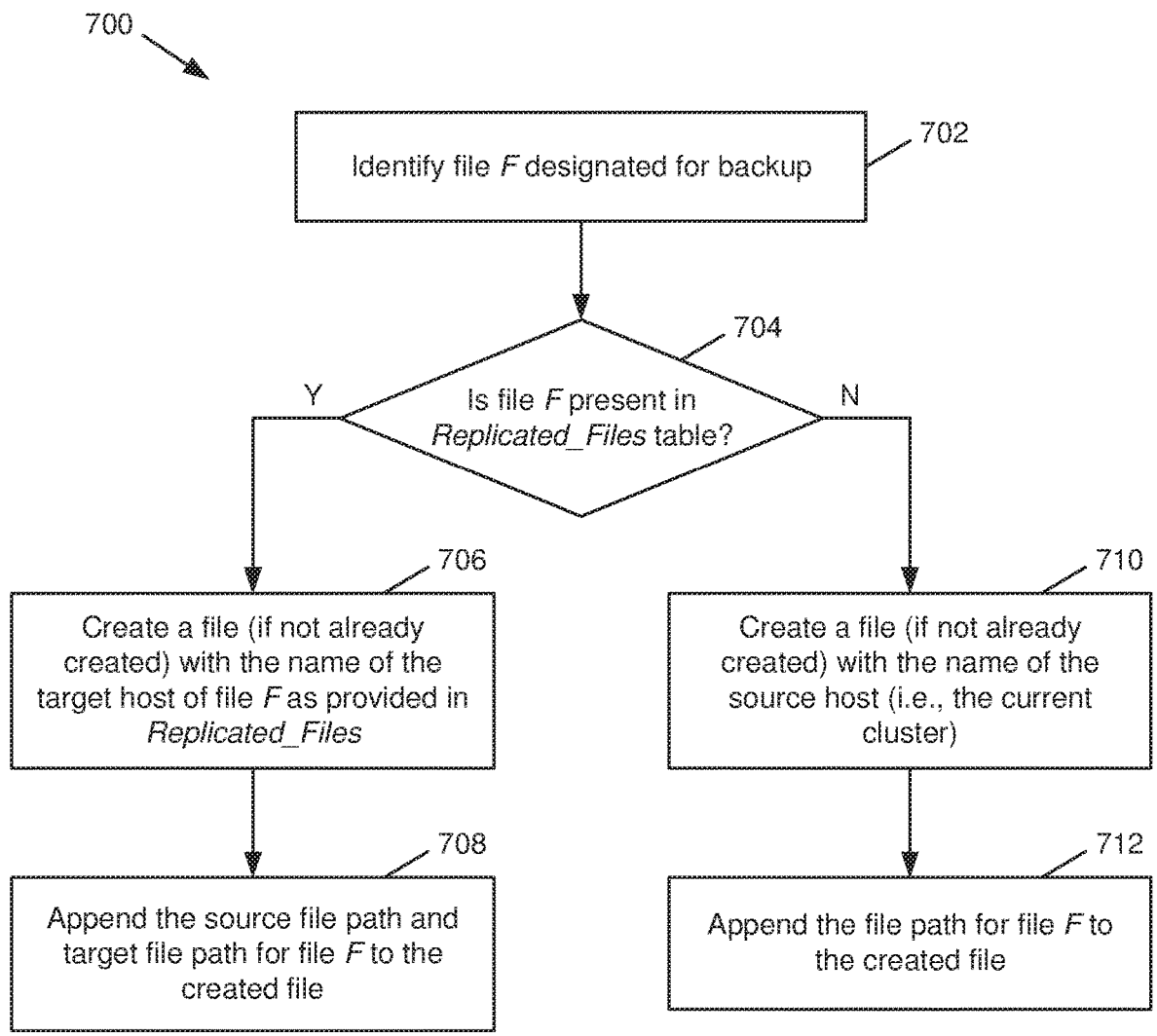
FIG. 7 is a flow diagram of a method for generating respective file lists corresponding to a set of files designated for backup in accordance with various aspects described herein.

Next, for each file F in the list of files for backup as identified by the policy handler component 120, the policy handler component 120 can create respective file lists 70 as shown by method 700 in FIG. 7. As shown in FIG. 7, method 700 begins at 702 by identifying a file F that has been designated for backup via the backup policy 60. While method 700 illustrates only a single processing iteration for a single designated file F, it should be appreciated that the policy handler component 120 can execute method 700 for each file that is included in the list of files to be backed up as generated by the policy handler component 120 based on the HTTP request provided by the DMA component 130.

At 704, the policy handler component 120 can determine whether file F as identified at 702 is present in a Replicated_Files table as generated by a replication logging component 310 according to method 400 and/or another suitable replication data structure 50. If file F is determined to be present in Replicated_Files at 704, method 700 proceeds from 704 to 706.

At 706, the policy handler component 120 can create a file, e.g., a file list 70 as shown in diagram 600, with the name of the target host for file F as indicated in the Replicated_Files table if a file for the target host has not yet been created, e.g., in a previous iteration of method 700 for an earlier processed file. Next, at 708, the policy handler component 120 can append the source file path and target file path for file F as provided in Replicated_Files to the file created (or identified, if the file was previously created) at 706. As a result of the actions performed at 706 and 708, a file list 70 for the target host associated with file F is created or modified to include the source file path and target file path of file F.

Returning to 704, if the policy handler component 120 instead determines that file F is not present in the Replicated_Files table, method 700 can instead proceed to 710, in which a file for the source host (e.g., the primary cluster 10 that stores the original copy of file F) is created if such a file was not previously created, e.g., in a previous iteration of method 700 for an earlier processed file. Next, at 712, the file path for file F is appended to the file created (or identified, if the file was previously created) at 710. Because file F was determined to not be replicated at 704, only the source file path, e.g., the path of file F on the primary cluster, is added to the file by the policy handler component 120 at 712.

Figure 8:
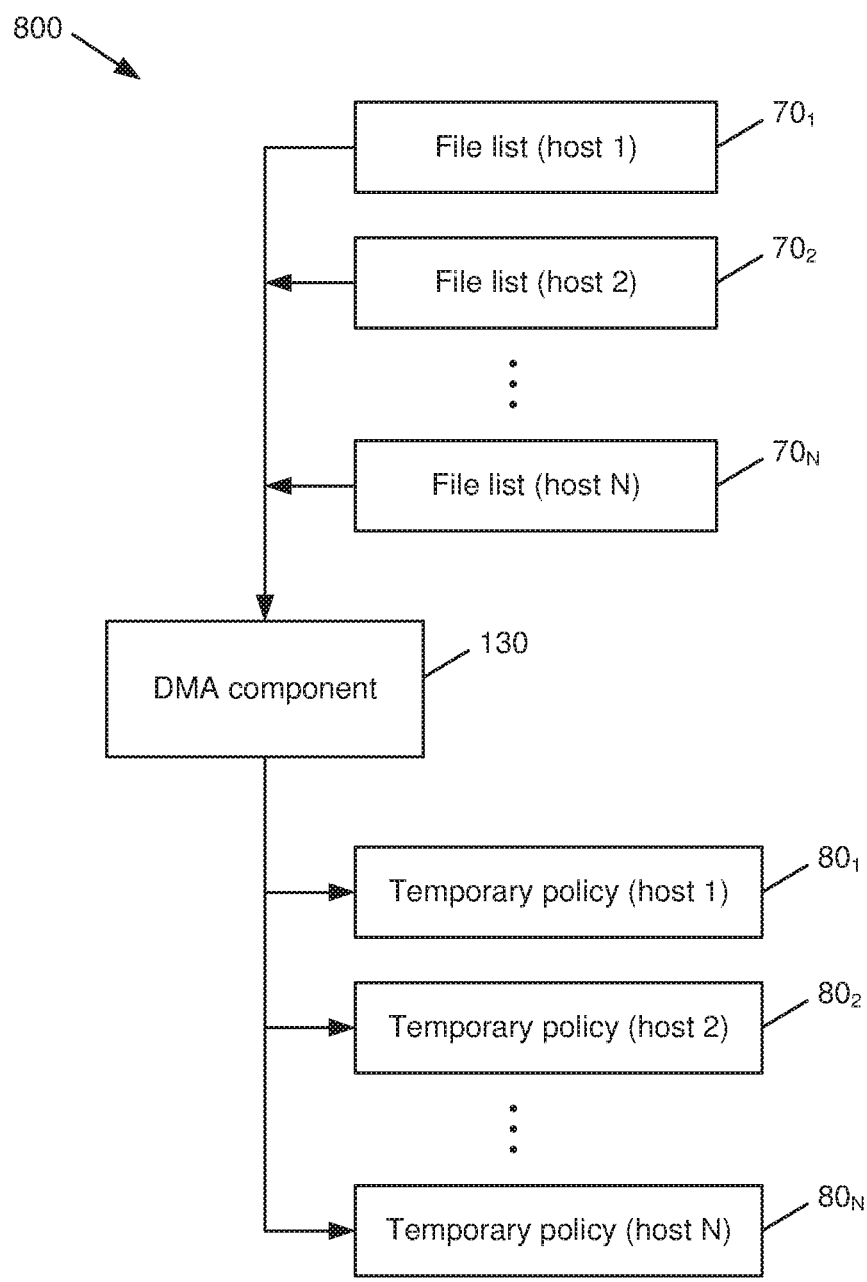
FIG. 8 is a diagram depicting generation of temporary backup policies based on respective file lists in accordance with various aspects described herein.

In an aspect, once method 700 has been performed by the policy handler component 120 for each file designated for backup, the policy handler component 120 will have created file lists 70 for each target host on which current copies of the designated files reside. Collectively, these file lists 70 can contain entries for each designated file, whether replicated or not, along with the respective paths to the respective designated files. In response to completing the file lists 70 for each of the files designated for backup as described above, the policy handler component 120 can send the respective file lists 70, and/or file details associated with the file lists 70, to the DMA component 130 in an HTTP response, e.g., as shown by diagram 800 in FIG. 8. Once the file lists 70 have been successfully transferred to the DMA component 130, the policy handler component 120 can delete its local copies of the file lists 70.

As further shown by diagram 800, the file lists 70 provided to the DMA component 130 by the policy handler component 120 can provide the DMA component 130 with details of all of the files designated for backup, e.g., such that the DMA component 130 can determine, based on the file lists 70, the respective host(s) that contain the respective files designated for backup.

In an aspect, the DMA component 130 can create a dynamic temporary policy 80 as shown in diagram 800 for each of the file lists 70 received in response to its HTTP request to the policy handler component 120. In doing so, the DMA component 130 can divide a backup policy 60 into a group of temporary policies 80, e.g., N temporary policies 801-80N that respectively correspond to the received file lists $70_1$-$70_N$. In a further aspect, each of the temporary policies 80 generated by the DMA component 130 can contain a name of the corresponding cluster (e.g., either the primary cluster 10 or a secondary cluster 12 that serves as a replication target) and the files stored on the corresponding host to be backed up.

As shown in diagram 800, the DMA component 130 can split a single NAS backup policy into multiple smaller temporary policies 80 targeted to different clusters. In an aspect, the DMA component 130 can initiate an NDMP backup job for each of the temporary policies 80, e.g., according to one or more NDMP backup techniques as known in the art. These temporary policies can then be executed by the DMA component 130 for respective secondary clusters 12 as identified in the temporary policies 80, e.g., as described above with respect to FIG. 5. Once all of the temporary backup jobs corresponding to the temporary policies 80 are completed, e.g., by transferring each of the files designated for backup according to a parent backup policy 60 to a media server 40 or other destination, the parent backup job can be marked as complete, and the temporary policies 80 generated by the DMA component 130 can be deleted.

Figure 9:
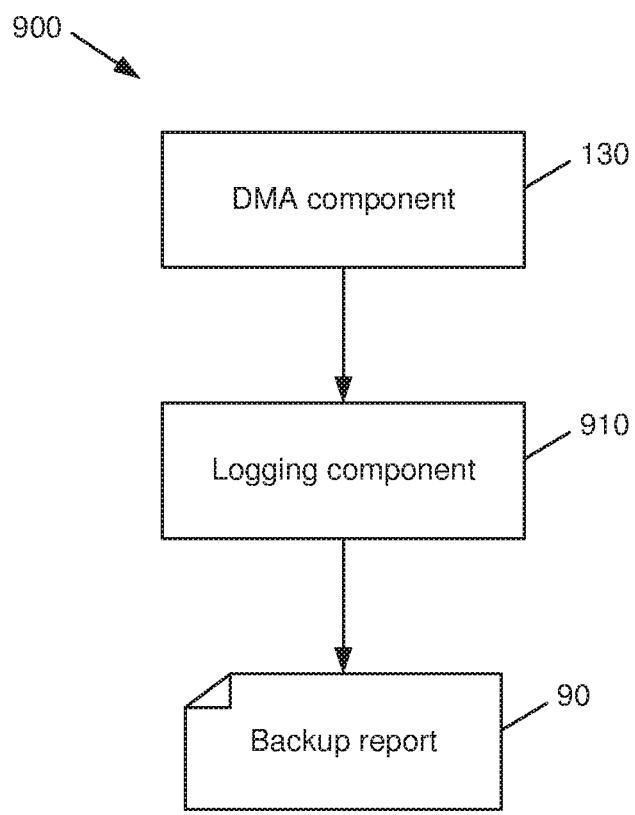
FIG. 9 is a block diagram of a system that facilitates logging a result of a backup operation in accordance with various aspects described herein.

With reference now to FIG. 9, a block diagram of a system 900 that facilitates logging a result of a backup operation in accordance with various aspects described herein is illustrated. Repetitive description of like elements employed in other embodiments described herein is omitted for brevity. As shown in FIG. 9, system 900 includes a logging component 910 that can generate a report 90, e.g., as a catalog and/or in another suitable format, in response to one or more files being determined to have been successfully transferred (e.g., to a media server 40 or other destination) via a backup policy 60. In an aspect, since the DMA component 130 is provided with the source file path of each of the files impacted by the backup policy 60, the logging component 910 can populate the report 90 with the primary file path for each of the impacted files, e.g., as associated with a primary cluster 10, even if said files were backed up from a secondary cluster 12. Stated another way, the logging component 910 can indicate that a given file has been transferred via a backup operation from a primary cluster 10 to a media server 40 or other destination instead of from a secondary cluster 12 from which the transfer actually occurred. This can be done, for example, to facilitate a simplified backup experience for a system administrator and/or other user. In some implementations, the temporary policies 80 and/or details regarding their execution can be provided to a system administrator or other user upon request, e.g., either within the report 90 itself or as a supplemental report.

Figure 10:
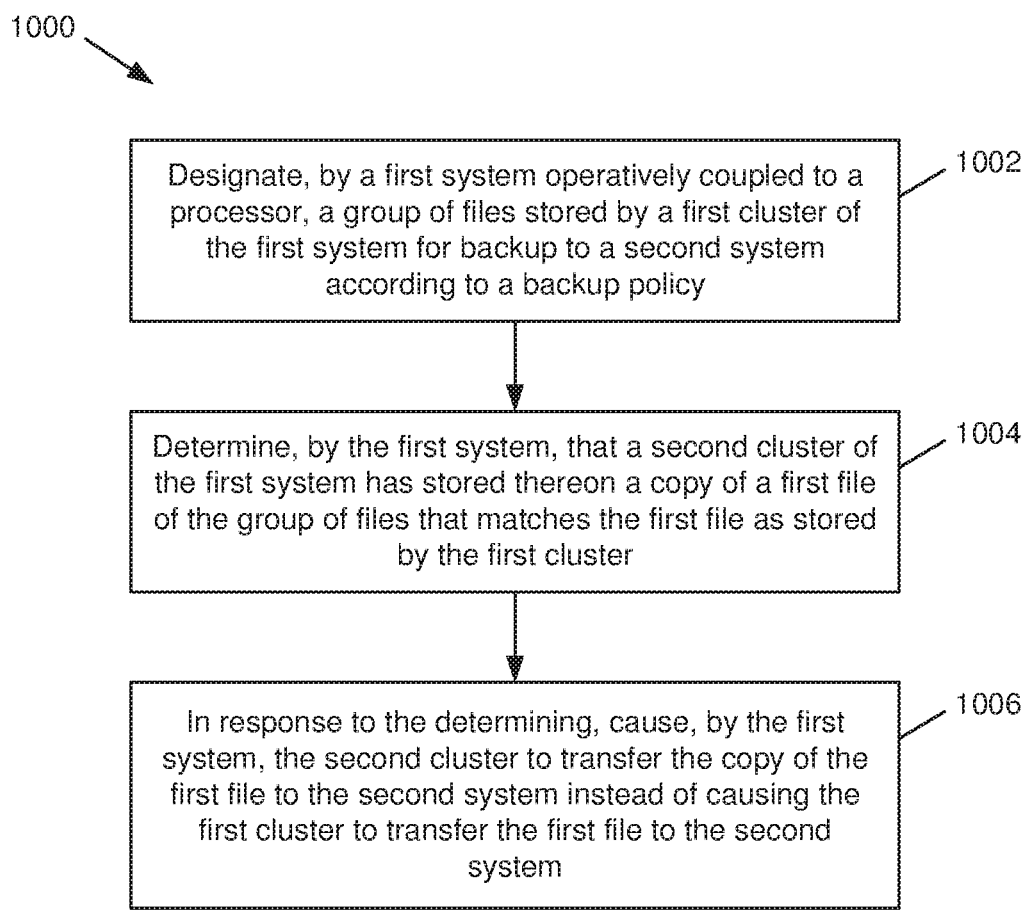
FIG. 10 is a flow diagram of a method that facilitates backup task processing in a data storage system in accordance with various aspects described herein.

Referring next to FIG. 10, a flow diagram of a method 1000 that facilitates backup task processing in a data storage system in accordance with various aspects described herein is illustrated. At 1002, a first system (e.g., system 100) operatively coupled to a processor can designate (e.g., by a backup initiation component 110) a group of files (e.g., files 30) stored by a first cluster of a data storage system (e.g., a primary cluster 10) for backup to a second system (e.g., via a media server 40) according to a backup policy (e.g., a backup policy 60).

At 1004, the first system can determine (e.g., by a policy handler component 120) that a second cluster of the data storage system (e.g., a secondary cluster 12) has stored thereon a copy (e.g., a copy 32) of a first file of the group of files that matches the first file as stored by the first cluster.

At 1006, in response to the determination performed at 1004, the first system can cause (e.g., by a DMA component 130) the second cluster identified at 1004 to transfer the copy of the first file as stored on the second cluster to the second system, e.g., instead of causing the first cluster to transfer the first file to the second system.

FIGS. 4, 7 and 10 as described above illustrate methods in accordance with certain aspects of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 11:
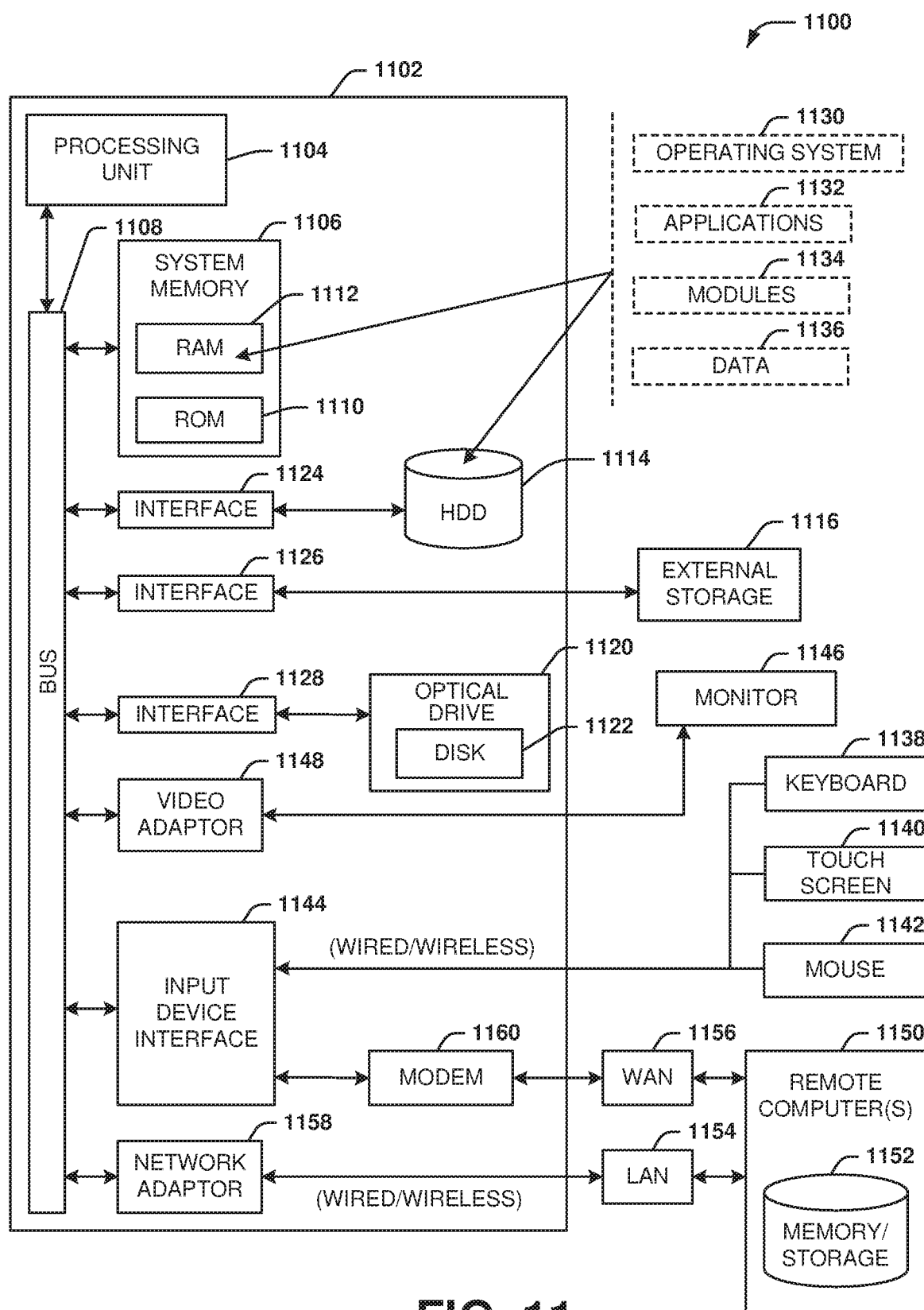
FIG. 11 is a diagram of an example computing environment in which various embodiments described herein can function.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD), a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
  a memory that stores computer executable components; and
  a processor that executes the computer executable components stored in the memory, wherein the computer executable components comprise:
    a backup initiation component that selects a group of files stored by a primary computing cluster of the data storage system for backup to a media server according to a backup policy;
    a policy handler component that identifies secondary computing clusters of the data storage system having copies of files of the group of files, via replication of the files from the primary computing cluster to the secondary computing clusters, in response to determining that no modification operations have been performed on the respective files as stored by the primary computing cluster subsequent to a time at which the files were replicated to the secondary clusters, wherein each of the secondary computing clusters is distinct from the primary computing cluster, and wherein the media server is distinct from the primary computing cluster and the secondary computing clusters; and
    a data management application component that, in response to the policy handler component identifying the secondary computing clusters, splits the backup policy into temporary backup policies, the temporary backup policies targeted to respective ones of the secondary computing clusters and corresponding to respective sub-groups of the group of files that have been replicated to the respective ones of the secondary computing clusters, and directs, according to the temporary backup policies, the secondary computing clusters to transfer the copies of the files to the media server instead of directing the primary computing cluster to transfer the files to the media server.

2. The data storage system of claim 1, wherein the computer executable components further comprise:
  a replication component that replicates the files from the primary computing cluster to the secondary computing cluster, resulting in the copies of the files being stored at the secondary computing cluster.

3. The data storage system of claim 2, wherein the computer executable components further comprise:
  a replication logging component that creates respective records for the files in a data structure in response to the replication component successfully replicating the files to the secondary computing clusters.

4. The data storage system of claim 3, wherein the replication logging component removes a record, of the respective records and for a file of the files, in the data structure in response to the file being modified at the primary computing cluster.

5. The data storage system of claim 4, wherein the policy handler component determines that a modification operation, of the modification operations, has been performed on the file subsequent to the time at which the file was replicated to the secondary clusters in response to the record for the file being determined to have been removed from the data structure by the replication logging component.

6. The data storage system of claim 3, wherein the policy handler component generates respective lists comprising the respective sub-groups of the group of files as indicated by the respective records of the data structure.

7. The data storage system of claim 6, wherein the data management application component divides the backup policy into the temporary backup policies based on the respective lists generated by the policy handler component and the respective records of the data structure.

8. The data storage system of claim 7, wherein the data management application component deletes the temporary backup policies in response to the group of files being determined to have been successfully transferred to the media server.

9. The data storage system of claim 1, wherein the data management component, in response to the policy handler component determining that a copy of a file of the group of files is absent from the secondary computing clusters, directs the primary computing cluster to transfer the file to the media server.

10. A method, comprising:
  designating, by a first system operatively coupled to a processor, a group of files stored by a first cluster of the first system for backup to a second system, distinct from the first system, according to a backup policy;
  determining, by the first system, that second clusters of the first system have stored thereon copies of files of the group of files via a replication of the files from the first cluster to the second clusters and that no modifying operations have been performed on the files as stored by the first cluster subsequent to a time at which the replication occurred, wherein the second clusters are distinct from the first cluster; and
  in response to the determining:
    splitting, by the first system, the backup policy into temporary backup policies, the temporary backup policies being targeted to respective ones of the second clusters and corresponding to respective sub-groups of the group of files that have been replicated to the respective ones of the second clusters; and
    causing, by the first system according to the temporary backup policies, the second clusters to transfer the copies of the files to the second system instead of causing the first cluster to transfer the files to the second system.

11. The method of claim 10, further comprising:
  replicating, by the first system, the files from the first cluster to the second clusters, resulting in the copies of the files being stored at the second clusters.

12. The method of claim 11, further comprising:
  generating, by the first system, a first records for the first files in a data structure in response to the replicating.

13. The method of claim 12, further comprising:
  causing, by the first system, the first cluster to transfer a file of the group of files to the second system in response to a record, of the records and for the file, being determined to be absent from the data structure.

14. The method of claim 12, further comprising:
  generating, by the first system, respective lists of the respective sub-groups of the group of files as indicated by respective records of the data structure.

15. The method of claim 14,
  wherein the splitting is based on the respective lists and the records of the data structure.

16. A non-transitory machine-readable medium comprising computer executable instructions that, when executed by a processor of a data storage system, facilitate performance of operations, the operations comprising:

receiving a backup policy for transferal of a group of files from a primary storage location of the data storage system to a media server that is not part of the data storage system;

identifying secondary storage locations of the data storage system having stored thereon, via replication of files of the group of files from the primary storage location to the secondary storage locations, copies of the files, wherein the primary storage location is not any of the secondary storage locations; and in response to the identifying and further in response to determining that no modifying operations have been performed on the files as stored at the primary storage location after the files were replicated from the primary storage location to the secondary storage locations:

dividing the backup policy into temporary backup policies, wherein the temporary backup policies are targeted to respective ones of the secondary storage locations and correspond to respective sub-groups of the group of files that have been replicated to the respective ones of the secondary storage locations; and causing, pursuant to the temporary backup policies, the copies of the files to be transferred from the secondary storage locations to the media server instead of causing the files to be transferred from the primary storage location to the media server.

17. The non-transitory machine-readable medium of claim 16, wherein the operations further comprise:

replicating the files from the primary storage location to the secondary storage locations, resulting in the copies of the files being stored at the secondary storage locations; and creating records for the files in a data structure in response to the replicating.

18. The non-transitory machine-readable medium of claim 17, wherein the operations further comprise:

causing a file of the group of files to be transferred from the primary storage location to the media server in response to a record, of the records and for the file, being determined to be absent from the data structure.

19. The non-transitory machine-readable medium of claim 17, wherein the operations further comprise:

generating respective lists of the respective sub-groups of the group of files as indicated by records of the data structure.

20. The non-transitory machine-readable medium of claim 19, wherein the:

dividing of the backup policy is based on the respective lists and the records of the data structure.

* * * * *